US010440198B2

(12) United States Patent
Hasegawa

(10) Patent No.: US 10,440,198 B2
(45) Date of Patent: Oct. 8, 2019

(54) IMAGE PROCESSING APPARATUS, MOBILE TERMINAL, AND METHODS FOR CONTROLLING THE SAME

(71) Applicant: CANON KABUSHIKI KAISHA, Tokyo (JP)

(72) Inventor: Yuya Hasegawa, Abiko (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/822,450

(22) Filed: Nov. 27, 2017

(65) Prior Publication Data

US 2018/0159990 A1 Jun. 7, 2018

(30) Foreign Application Priority Data

Dec. 5, 2016 (JP) .................................. 2016-236243

(51) Int. Cl.
 *G06F 3/12* (2006.01)
 *H04N 1/00* (2006.01)
 *H04N 1/327* (2006.01)
 *H04W 4/80* (2018.01)
(52) U.S. Cl.
 CPC ..... *H04N 1/00206* (2013.01); *H04N 1/00307* (2013.01); *H04N 1/00315* (2013.01); *H04N 1/32776* (2013.01); *H04W 4/80* (2018.02); *H04N 2201/0041* (2013.01); *H04N 2201/0094* (2013.01)
(58) Field of Classification Search
 CPC .......... H04N 1/00206; H04N 1/00307; H04N 1/00315; H04N 1/32776; H04N 2201/0041; H04N 2201/0094; H04W 4/80
 See application file for complete search history.

(56) References Cited

U.S. PATENT DOCUMENTS

| | | | | |
|---|---|---|---|---|
| 2011/0093634 A1* | 4/2011 | Minami | ................ | G06F 13/385 710/106 |
| 2013/0070297 A1* | 3/2013 | Kato | .................. | H04N 1/00217 358/1.15 |
| 2014/0153017 A1* | 6/2014 | Watanabe | ............. | G06F 3/1212 358/1.13 |
| 2014/0213190 A1* | 7/2014 | Yamaoka | ............... | G06F 3/1204 455/41.3 |
| 2014/0366101 A1* | 12/2014 | Murata | ............. | H04N 1/00127 726/4 |
| 2015/0222784 A1* | 8/2015 | Ando | ................. | H04N 1/00214 358/1.15 |

FOREIGN PATENT DOCUMENTS

JP 2012-243117 A 12/2012

* cited by examiner

*Primary Examiner* — Moustapha Diaby
(74) *Attorney, Agent, or Firm* — Venable LLP

(57) ABSTRACT

An image processing apparatus is capable of communicating with a mobile terminal by short range radio communication, and includes an image reader that reads an image of a document, a generator that generates image data based on the image read by the image reader, and a notifying controller that notifies a user to bring the mobile terminal close to a communicable area in accordance with completion of reading the image by the image reader. In addition, a transmitter transmits the image data generated by the generator to the mobile terminal by the short range radio communication in accordance with being able to communicate with the mobile terminal by short range radio communication.

9 Claims, 12 Drawing Sheets

IMAGE PROCESSING APPARATUS, MOBILE TERMINAL, AND METHODS FOR CONTROLLING THE SAME

BACKGROUND OF THE INVENTION

Field of the Invention

The present invention relates to an image processing apparatus, a mobile terminal, and methods for controlling the same.

Description of the Related Art

In recent years, mobile terminals such as smart phones and tablet PCs in which a short-range wireless communication function according to TransferJet™, NFC, or the like is implemented are becoming widespread. Also, a technique in which, for cases where a short-range wireless communication function is not implemented in a mobile terminal, a short range wireless communication function is used in the mobile terminal by using a USB-connected external apparatus such as a dongle in which the short-range wireless communication function is implemented has also become widespread. There are various short-range wireless communication standards such as NFC (Near Field Communication), Bluetooth™, and TransferJet. For example, it is possible to perform a large amount of data communication without needing to construct a wireless LAN environment or the like in advance in the case of short-range wireless communication by TransferJet.

As one example of an application of TransferJet, using TransferJet to transfer large amounts of image data in image forming apparatuses such as multifunction peripherals (MFPs) and printers is being investigated. Japanese Patent Laid-Open No. 2012-243117 proposes a technique in which an information terminal transmits a plurality of files (file data) collectively to an MFP via a communication interface that complies with TransferJet, and the MFP collectively performs printing based on the received file data.

In a case in which an image processing apparatus (MFP or the like) is caused to execute printing from a mobile terminal by using TransferJet, when a user brings the mobile terminal close to the image processing apparatus, a transfer of image data from the mobile terminal to the image processing apparatus is started, and then printing is executed. However, in a case where TransferJet is used from a mobile terminal to cause an image processing apparatus to execute a scan of a document image, and to cause scan data (image data) to be transferred to the mobile terminal, the transfer of the scan data to the mobile terminal cannot be started until the scan execution completes. In such a case, it is possible that in each of the image processing apparatus and the mobile terminal, an operational flow that is different to the operational flow for using TransferJet from the mobile terminal to cause the image processing apparatus to execute printing will be required.

SUMMARY OF THE INVENTION

The present invention was conceived in view of the above described issues. The present invention provides a technique for using TransferJet from a mobile terminal to cause the image processing apparatus to execute a scan job, and to cause the scan data to be transferred from the image processing apparatus to the mobile terminal.

According to one aspect of the present invention, there is provided an image processing apparatus having a scanning function for generating image data by scanning a document, the apparatus comprising: a reception unit configured to receive a scan job from a mobile terminal by using TransferJet communication; a processing unit configured to execute the scanning function based on the scan job received by the reception unit; and a transmission unit configured to transmit image data generated by the scanning function to the mobile terminal by using TransferJet communication.

According to another aspect of the present invention, there is provided a mobile terminal, comprising: a generation unit configured to generate a scan job for causing an image processing apparatus having a scanning function for generating image data by scanning a document in accordance with a setting by a user, to execute the scanning function; a transmission unit configured to transmit the scan job generated by the generation unit to the image processing apparatus by TransferJet communication; and a reception unit configured to, after execution of the scanning function according to the scan job completes by the image processing apparatus, receive from the image processing apparatus, by using TransferJet communication, the image data generated by the scanning function.

According to still another aspect of the present invention, there is provided an image processing apparatus having a scanning function for generating image data by scanning a document and a short-range wireless communication function, the apparatus comprising: a reception unit configured to receive a scan job from a mobile terminal by using the short-range wireless communication function; a first processing unit configured to execute the scanning function based on the scan job; a second processing unit configured to execute, in order to transmit image data generated by the scanning function, transmission of a connection request of the short-range wireless communication function and display of a message prompting a user to bring a mobile terminal close to the image processing apparatus; and a transmission unit configured to, by using the short-range wireless communication function, transmit the image data generated by the scanning function to the mobile terminal which responded to the connection request.

According to yet another aspect of the present invention, there is provided a method of controlling an image processing apparatus having a scanning function for generating image data by scanning a document, the method comprising: receiving a scan job from a mobile terminal by using TransferJet communication; executing the scanning function based on the received scan job; and transmitting image data generated by the scanning function to the mobile terminal by using TransferJet communication.

By virtue of the present invention it becomes possible to use TransferJet to cause an image processing apparatus to execute a scan job from a mobile terminal, and to cause the scan data to be transferred from the image processing apparatus to the mobile terminal.

Further features of the present invention will become apparent from the following description of exemplary embodiments (with reference to the attached drawings).

DESCRIPTION OF THE EMBODIMENTS

Hereinafter, embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention.

In the embodiments below, a multi function peripheral (MFP) which is an image processing apparatus having a large number of functions such as a print function, a reading function, a copy function, an image transmission function, and the like is described as an example of an image processing apparatus. Note that the present embodiment can be applied similarly to image processing apparatuses such as a copying machine, a facsimile apparatus, and the like and not only an MFP.

<TransferJet Wireless Communication Function>

Figure 1:
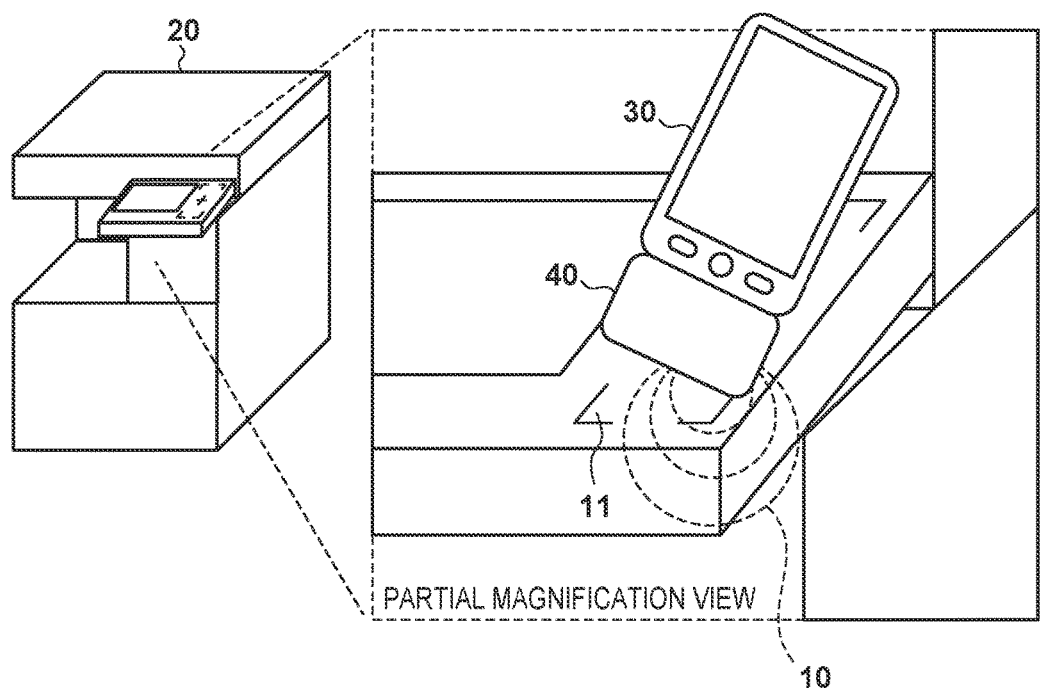
FIG. 1 illustrates an example of a positional relationship between an MFP, a mobile terminal, and a communication apparatus.

Firstly, a TransferJet short-range wireless communication function of an MFP 20 and a mobile terminal 30 according to the present embodiment will be described. FIG. 1 illustrates an example of a positional relationship between the MFP 20, the mobile terminal 30, and a communication apparatus 40 connected to the mobile terminal 30. The MFP 20 has a large number of functions such as printing (print), reading (scan), copying (copy), FAX (facsimile) transmission/reception, and the like. Also, the MFP 20 has a wireless communication function according to a wireless LAN standard and a short-range wireless communication function according to TransferJet™ as wireless communication functions. The mobile terminal 30 is a wireless terminal apparatus such as a smart phone, a tablet personal computer, or the like. In the present embodiment, the communication apparatus 40, which has a short-range wireless communication function according to TransferJet, is externally connected to the mobile terminal 30. By this, the mobile terminal 30 can perform wireless communication according to TransferJet using the communication apparatus 40. Note that the communication apparatus 40 is able to connect to the mobile terminal 30 by a USB connection, for example.

TransferJet (hereinafter abbreviated to "TJ" in some cases) is one standard for short-range wireless communication. By bringing the antennas of a pair of communication devices that support TransferJet close to each other (holding the antenna of one communication device up to the antenna of the other communication device), a connection is automatically established between the communication devices and communication is started. A maximum 560 Mbps transfer rate is implemented for a wireless communication using TransferJet (TransferJet communication (TJ communication)). Accordingly, it is possible to transmit/receive various data such as document data, image data, and moving image data by TJ communication. In this way, when TransferJet is used, it is possible to realize faster communication than when using NFC, which is another standard for short-range wireless communication, while providing a user with a feeling of control similar to in the case of using NFC. Also, with TransferJet, since the communication range is short at a few cm, it is possible to prevent the occurrence of interference with other wireless systems and to suppress the possibility of the content of the communication leaking.

A communicable area 10 when the MFP 20 of the present embodiment performs TJ communication is an area of a range of a few cm from the portion 11 at which the antenna (TransferJet coupler) for TJ communication is arranged. When the communication apparatus 40 connected to the mobile terminal 30 is brought within the communicable area 10 of the MFP 20, a connection is established between the communication apparatus 40 and the MFP 20, and TJ communication is started. Specifically, in a state in which the MFP 20 or the communication apparatus 40 is transmitting a connection request by TransferJet, a connection between the communication apparatus 40 and the MFP 20 is established when the communication apparatus 40 enters the communicable area 10. Furthermore, by TJ communication via the established connection, data is transmitted from the mobile terminal 30 to the MFP 20, or data is transmitted from the MFP 20 to the mobile terminal 30. Note that in the TJ communication, an apparatus that transmitted connection request transmits data and an apparatus that receives a connection request receives data.

<Configuration of the MFP 20>

Figure 2:
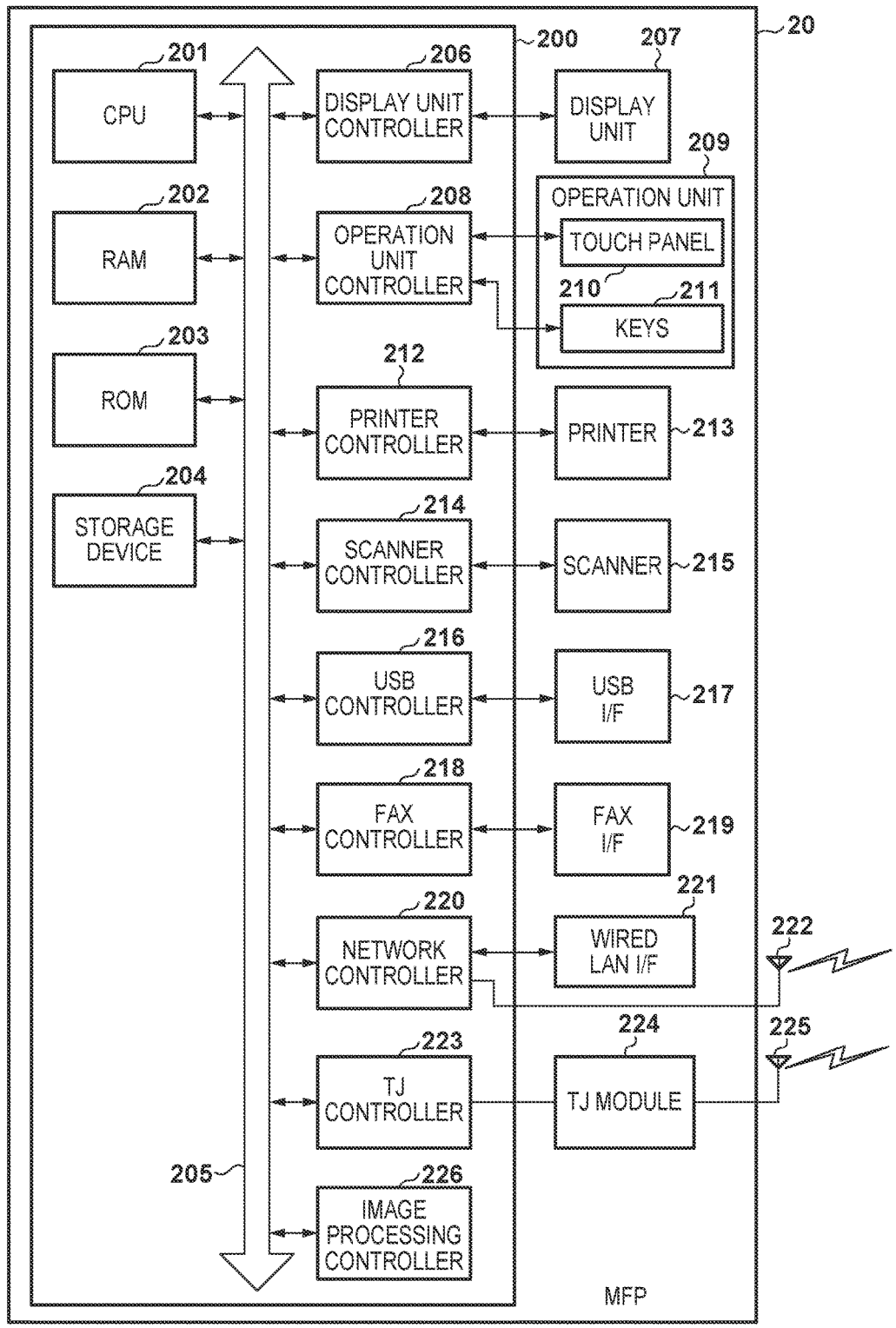
FIG. 2 is a block diagram illustrating an example of a hardware configuration of the MFP.

FIG. 2 is a block diagram for illustrating an example of a hardware configuration of the MFP 20. The MFP 20 comprises a controller 200, and a display unit 207, an operation unit 209, a printer 213, a scanner 215, a USB I/F 217, a FAX I/F 219, a wired LAN I/F 221, antennas 222 and 225, and a TJ module 224 that are connected to the controller 200. An antenna 222 is an antenna for wireless communication according to a wireless LAN standard. An antenna 225 is an antenna for wireless communication according to TransferJet.

The controller 200 comprises a CPU 201, a RAM 202, a ROM 203, a storage device 204, a system bus 205, a display unit controller 206, an operation unit controller 208, a printer controller 212, a scanner controller 214, a USB controller 216, a FAX controller 218, a network controller 220, a TJ controller 223, and an image processing controller 226. These devices are connected to each other via the system bus 205 within the controller 200. The operation unit 209 comprises a touch panel 210 and keys 211.

The CPU 201 is connected to each device via the system bus 205 and controls the MFP 20 overall. The RAM 202 is a work memory for the CPU 201 to operate, and is used for loading various programs, saving calculation processing results, and saving image data processed by the image processing controller 226. The ROM 203 is a memory for saving an activation program for the CPU 201 and various setting information. The storage device 204 is a non-volatile memory for saving programs and data of a large size. The storage device 204 is a memory device such as a flash memory that is arranged within the controller 200 or an HDD that is externally connected to the controller 200.

The display unit controller 206 transmits to the display unit 207 image data corresponding to a screen to be displayed on the display unit 207. The operation unit controller 208 provides to the CPU 201 data indicating input accepted from the touch panel 210 or the keys 211. The printer controller 212, in accordance with an instruction from the CPU 201, controls the printer 213 so as to execute image formation (printing) based on image data. The scanner controller 214, in accordance with an instruction from the CPU 201, controls the scanner 215 so as to execute image reading. The scanner 215 reads a document image, generates image data corresponding to the image, and outputs the generated image data to the scanner controller 214.

The USB controller 216 communicates with an external apparatus by controlling the USB I/F 217 to which the external apparatus is connected by USB. The FAX controller 218 performs FAX communication with an external apparatus via a public line network by controlling the FAX I/F 219 which is connected to the public line network. The network controller 220 communicates with an external apparatus via a wired LAN by controlling the wired LAN I/F 221 which is connected to the wired LAN. Also, the network controller 220 performs communication according to the wireless LAN standard (wireless LAN communication) via the antenna 222. The image processing controller 226 performs various image processing such as enlarging, reducing, and monochromizing, on image data outputted from the scanner 215. Also, the image processing controller 226 performs various image processing on image data for printing by the printer 213.

The TJ controller 223 performs wireless communication using TransferJet (TJ communication) via the antenna 225 by controlling the TJ module 224. The TJ controller 223 transmits a connection request to an external apparatus and performs transmission/reception of data with an external apparatus, by using the TJ module 224. Also, the TJ controller 223 establishes a connection according to TransferJet (TransferJet connection (TJ connection)) with an external apparatus when it receives a connection request from an external apparatus. The antenna 225 is arranged in the MFP 20 so as to perform TJ communication at a short range of a few cm with an external apparatus that was brought close (held up to) the MFP 20. In the present embodiment, the antenna 225 is built into the operation unit 209, as illustrated in FIG. 1.

<Configuration of the Mobile Terminal 30 and the Communication Apparatus 40>

Figure 3:
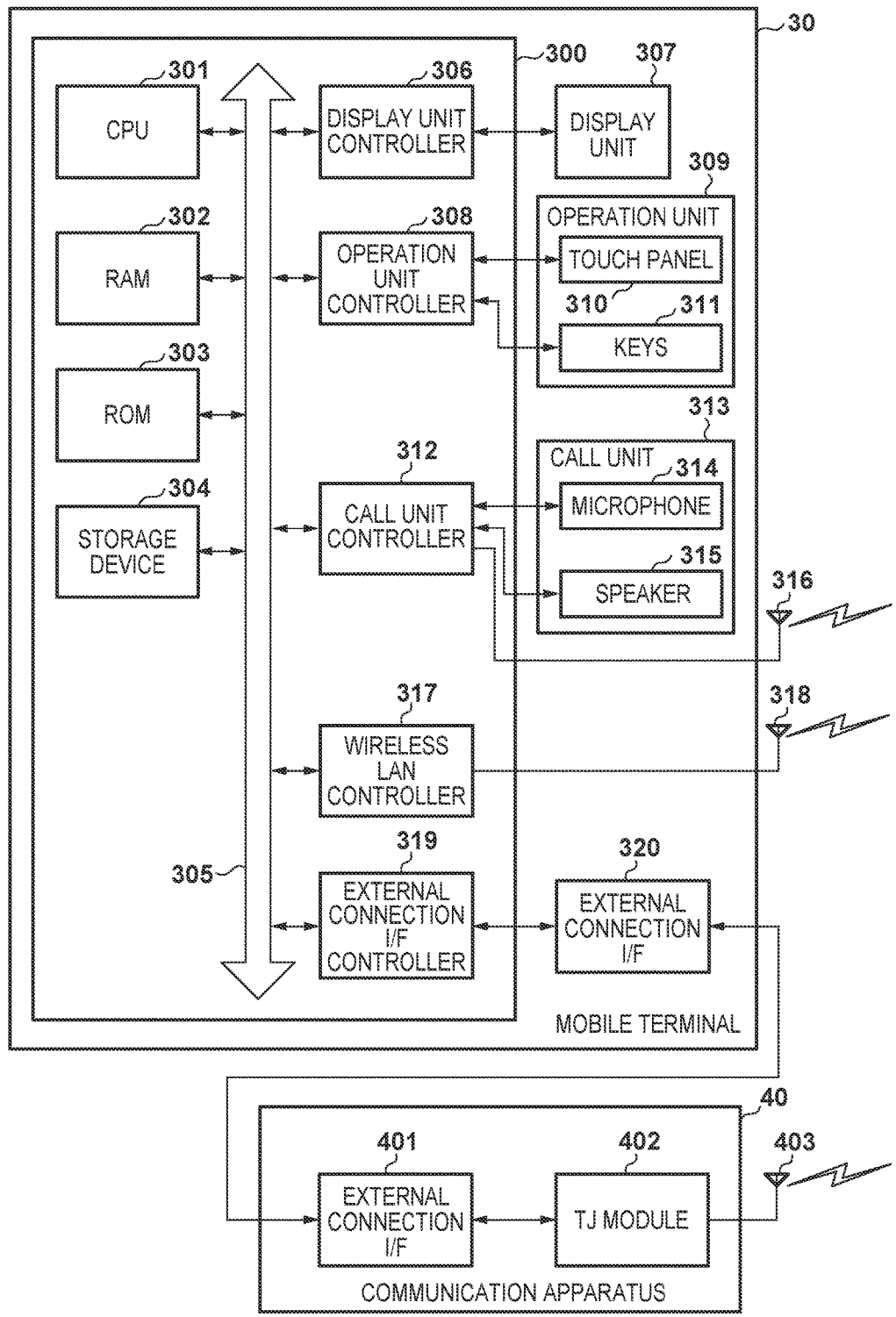
FIG. 3 is a block diagram illustrating an example of a hardware configuration of the mobile terminal and the communication apparatus.

FIG. 3 is a block diagram illustrating an example of a hardware configuration of the mobile terminal 30 and the communication apparatus 40. The mobile terminal 30 comprises a controller 300, and a display unit 307, an operation unit 309, a call unit 313, antennas 316 and 318, and an external connection I/F 320 connected to the controller 300. An antenna 316 is an antenna for wireless communication according to a communication standard such as 3G, LTE, LTE-Advanced, or the like. An antenna 318 is an antenna for wireless communication according to a wireless LAN standard.

The controller 300 comprises a CPU 301, a RAM 302, a ROM 303, a storage device 304, a system bus 305, a display unit controller 306, an operation unit controller 308, a call unit controller 312, a wireless LAN controller 317, and an external connection I/F controller 319. These devices are connected to each other via the system bus 305 within the controller 300. The operation unit 309 comprises a touch panel 310 and keys 311. The call unit 313 comprises a microphone 314 and a speaker 315.

The CPU 301 is connected to each device via the system bus 305 and controls the mobile terminal 30 overall. The RAM 302 is a work memory for the CPU 301 to operate, and is used for loading various programs and saving calculation processing results. The ROM 303 is a memory for saving an activation program for the CPU 301 and various setting information. The storage device 304 is a non-volatile memory for saving programs and data of a large size. The storage device 304 is a memory device such as a flash memory that is arranged within the controller 300 or an SD card that is externally connected to the controller 300.

The display unit controller 306 transmits to the display unit 307 image data corresponding to a screen to be displayed on the display unit 307. The operation unit controller 308 provides to the CPU 301 data indicating input accepted from the touch panel 310 or the keys 311. The call unit controller 312 converts an audio signal received from the microphone 314 into a signal for wireless transmission, and transmits it to a base station of a wireless access network as a wireless signal via the antenna 316. Also, the call unit controller 312 converts a signal received from a base station via the antenna 316 into an audio signal, and outputs the audio signal to the speaker 315. The wireless LAN controller 317 communicates (wireless LAN communication) by a wireless LAN standard via the antenna 318.

The external connection I/F 320 is an interface for externally connecting an external apparatus by wire to the mobile terminal 30. In the present embodiment, as illustrated in FIG. 3, the communication apparatus 40 is externally connected for wireless communication (TJ communication) that uses TransferJet. The communication apparatus 40 comprises an external connection I/F 401, a TJ module 402, and an antenna 403 for wireless communication according to TransferJet. It is necessary that the external connection I/F 401 and the external connection I/F 320 be interfaces that comply with the same standard, and for example they comply with USB or Lightning™.

The TJ module 402 is controlled via the external connection I/F controller 319 by a control application that operates on the mobile terminal 30. The TJ module 402, in accordance with control by the control application, transmits a connection request to an external apparatus and performs transmission/reception of data with the external apparatus. Also, when the TJ module 402 receives a connection request from an external apparatus, it establishes a connection according to TransferJet (TJ connection) with the external apparatus in accordance with control by the control application. Note that in the present embodiment, an example in which the communication apparatus 40 which has the TJ communication function is connected to the mobile terminal 30 is used, but configuration may be such that the mobile terminal 30 itself has the TJ communication function.

<Scan Processing Using the Mobile Terminal 30>

Next, a description will be given of an overview of an operational flow of the mobile terminal 30 and the MFP 20 in scan processing in which TransferJet is used to cause the mobile terminal 30 and the MFP 20 to cooperate, according to the present embodiment. In the scan processing according to the present embodiment, using TransferJet, the MFP 20 is caused to execute a scan of a document image from the mobile terminal 30, and is caused to transfer the obtained scan data to the mobile terminal 30.

Firstly, the mobile terminal 30, in accordance with settings by a user using the operation unit 309, generates a scan job for causing the MFP 20 to execute a scan of a document image. When, after that, a user brings the communication apparatus 40 connected to the mobile terminal 30 to within the communicable area 10 of the MFP 20, the mobile terminal 30 establishes a TJ connection with the MFP 20, and transmits the generated scan job to the MFP 20 by TJ communication.

The MFP 20 establishes the TJ connection with the external mobile terminal 30, and receives the scan job from the mobile terminal 30 by TJ communication. When the MFP 20 receives the scan job, it executes a scan of a document image in accordance with the received scan job. Specifically, the MFP 20, in accordance with settings of the scan job, executes a scan operation of reading the document image and generating image data (scan data). After completion of execution of the scan, the MFP 20, when the user brings the communication apparatus 40 connected to the mobile terminal 30 to within the communicable area 10 of the MFP 20, establishes the TJ connection with the mobile terminal 30 once again. When the MFP 20 establishes the TJ connection with the mobile terminal 30 again, it transmits the scan data obtained by scanning to the mobile terminal 30 by TJ communication.

When the mobile terminal 30 establishes the TJ connection with the MFP 20 once again after execution of the scan according to the scan job is completed by the MFP 20, it receives scan data obtained by scanning from the MFP 20 by TJ communication. By configuring in this way, scan processing in which TransferJet is used to cause the mobile terminal 30 and the MFP 20 to cooperate according to the present embodiment is realized.

In the scan processing described above, TJ communication is performed two times: TJ communication for transmitting a scan job from the mobile terminal 30 to the MFP 20, and TJ communication for transmitting image data (scan data) from the MFP 20 to the mobile terminal 30. Rather than these two TJ communications being performed consecutively, the scan operation by the MFP 20 is executed in the period between the first TJ communication and the second TJ communication. While the scan operation being executed, the user may keep the mobile terminal 30 (the communication apparatus 40) within the communicable area 10, or may move it temporarily outside of the communicable area 10. Below, a case in which the mobile terminal 30 (the communication apparatus 40) is present outside of the communicable area 10 during execution of the scan operation is envisioned.

The MFP 20, in a case where the mobile terminal 30 moved out of the communicable area 10 during execution of the scan operation, may display a notification on the display unit 207 related to work that needs to be done so that the user can easily understand it. Specifically, the MFP 20, after execution of the scan completes, may display a notification to prompt the user to bring the mobile terminal 30 close to the MFP 20 (move it into the communicable area 10) in order to establish a TJ connection between the MFP 20 and the mobile terminal 30.

Also, configuration may be taken such that, by the mobile terminal 30 displaying a similar notification on the display unit 307, the user can easily understand work that needs to be done in a case where the mobile terminal 30 moves outside of the communication area 10 during execution of the scan operation. Specifically, the mobile terminal 30, when transmission of the scan job to the MFP 20 has completed, may display on the display unit 307 a notification indicating that the scan data will be transmitted from the MFP 20 to the mobile terminal 30 after execution of the scanning by the MFP 20 completes. Configuration may be taken to, by such a notification, prompt the user to bring the mobile terminal 30 close to the MFP 20 (move it into the communicable area 10) in order to establish a TJ connection between the MFP 20 and the mobile terminal 30.

<The Mobile Terminal 30: Scan Job Generation>

Below, an example of an operational flow of each of the mobile terminal 30 and the MFP 20 for realizing the scan processing described above is described in detail.

Figure 4:
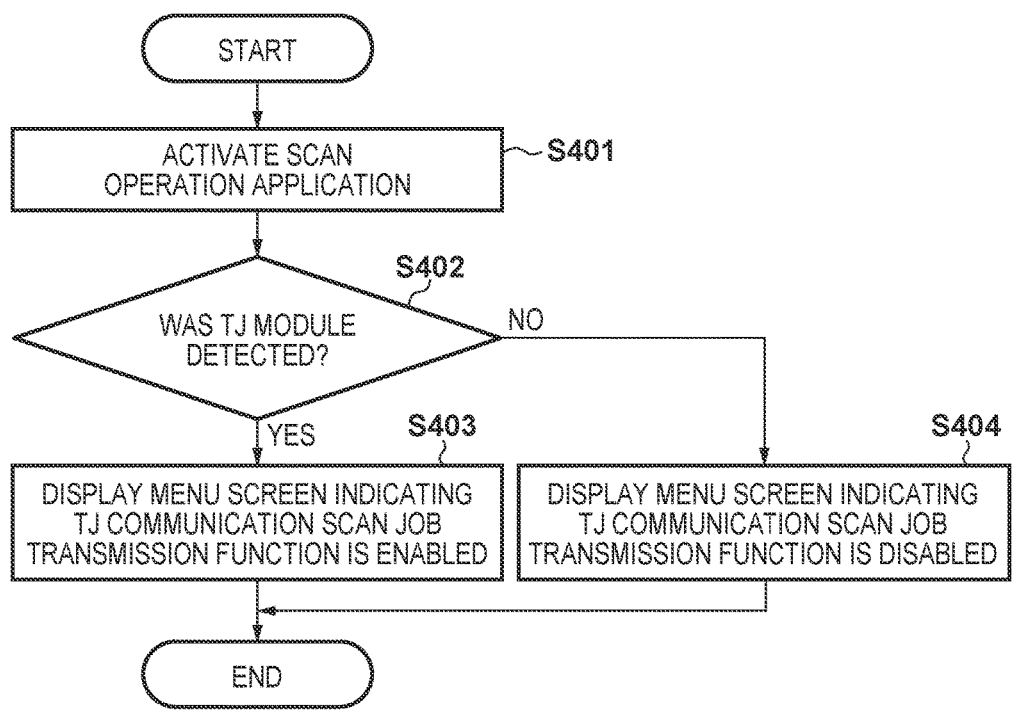
FIG. 4 is a flowchart for illustrating a control procedure for the mobile terminal to generate a scan job.

FIG. 4 is a flowchart for illustrating a control procedure for the mobile terminal 30 to generate a scan job. Processing of each step illustrated in FIG. 4 is realized in the mobile terminal 30 by the CPU 301 reading out a program stored in the ROM 303 or the storage device 304 and executing it. The user of the mobile terminal 30 is able to make settings for a scan job that the MFP to be used (the MFP 20 in the present embodiment) is to be caused to execute, by operating the mobile terminal 30 using a scan operation application installed on the mobile terminal 30 in advance. Furthermore, it is possible to instruct scan job transmission.

In step S401, the CPU 301 activates the scan operation application for generating a scan job that the MFP (image processing apparatus) is to be caused to execute. Next, in step S402, the CPU 301 attempts to detect a TJ module for TJ communication, and determines whether or not a TJ module is detected. The CPU 301 advances the processing to step S403 in the case where a TJ module is detected, and advances the processing to step S404 in the case where a TJ module is not detected. In the present embodiment, the TJ module in the communication apparatus 40 connected to the mobile terminal 30 is detected. Note that the TJ module may be built into the mobile terminal 30. In such a case, the CPU 301 detects whether or not a function of the TJ module is enabled in the mobile terminal 30.

The CPU 301, in accordance with the TJ module detection result of step S402, displays on the display unit 307 a menu screen for the user to perform settings for the MFP to be used, scan job settings (scan settings), and a scan job transmission instruction. Specifically, in the case where a TJ module is detected, the CPU 301, in step S403, displays on the display unit 307 a menu screen indicating that the scan job transmission function by TJ communication is enabled. Meanwhile, in the case where a TJ module is not detected, the CPU 301, in step S404, displays on the display unit 307 a menu screen indicating that the TJ communication scan job transmission function is disabled.

Figure 11A:
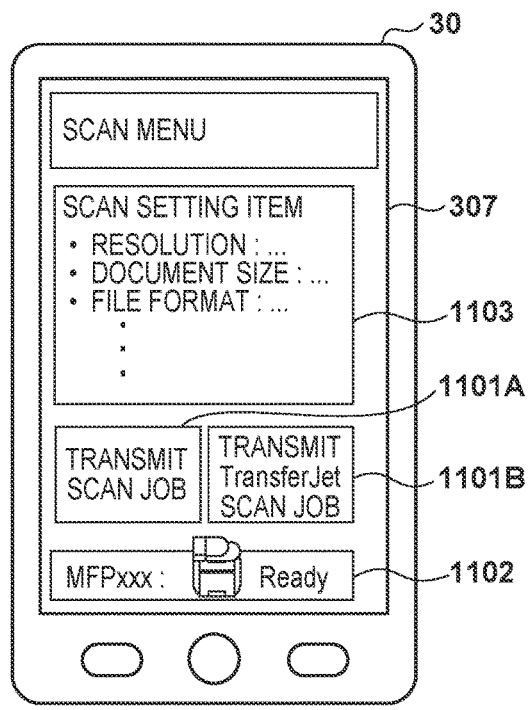
FIG. 11A to FIG. 11G illustrate examples of screens displayed on a display unit of the mobile terminal.

FIG. 11A illustrates an example of a menu screen displayed on the display unit 307 in step S403. In this menu screen, both transmit buttons 1101A and 1101B are enabled, and are in a state in which they can be selected by the user. The transmit button 1101A is a button for the user to instruct that a scan job be transmitted and scan data be received by wireless LAN communication. The transmit button 1101B is a button for the user to instruct that a scan job be transmitted and scan data be received by TJ communication.

Furthermore, in the menu screen of FIG. 11A, there is a region 1102 in which an MFP set to be used is indicated and a region 1103 in which the content of scan settings is displayed. In the regions 1102 and 1103, the setting content from when the scan operation application was used the previous time is displayed in advance. The user can change the MFP to be used to an MFP different to the MFP used the previous time by pressing (touching) the region 1102. Also, the user can change the scan settings to settings that are different to what was used the previous time by pressing the region 1103.

The user, in the menu screen of FIG. 11A, can set the MFP to be used, and can make scan job settings. Furthermore, the user can instruct that a scan job be transmitted and scan data be received in accordance with wireless LAN communication or TJ communication, by selecting one of the transmit buttons 1101A and 1101B.

Figure 11B:
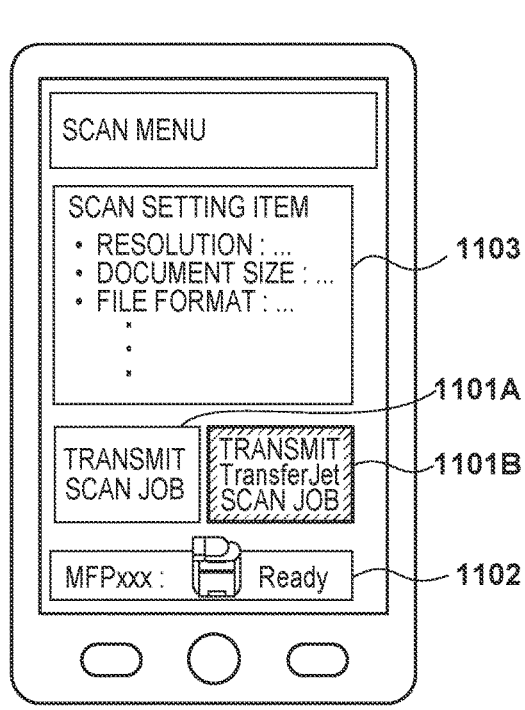

FIG. 11B illustrates an example of the menu screen displayed on the display unit 307 in step S404. In this menu screen, the transmit button 1101B is disabled, and other than the fact the state is such that the user cannot select the transmit button 1101B, it is the same as the menu screen of FIG. 11A. Accordingly, in the menu screen of FIG. 11B, it is not possible to instruct that a scan job be transmitted and scan data be received by TJ communication, but it is only possible to instruct that a scan job be transmitted and scan data be received by wireless LAN communication.

In step S403 or in step S404, setting of the MFP to be used and setting of the scan job are performed, and the CPU 301 generates a scan job when an enabled button out of the transmit buttons 1101A and 1101B is pressed. Furthermore, the CPU 301 transmits the generated scan job to the MFP to be used (the MFP 20) by wireless LAN communication or TJ communication.

<The Mobile Terminal 30: Scan Job Transmission>

Figure 5:
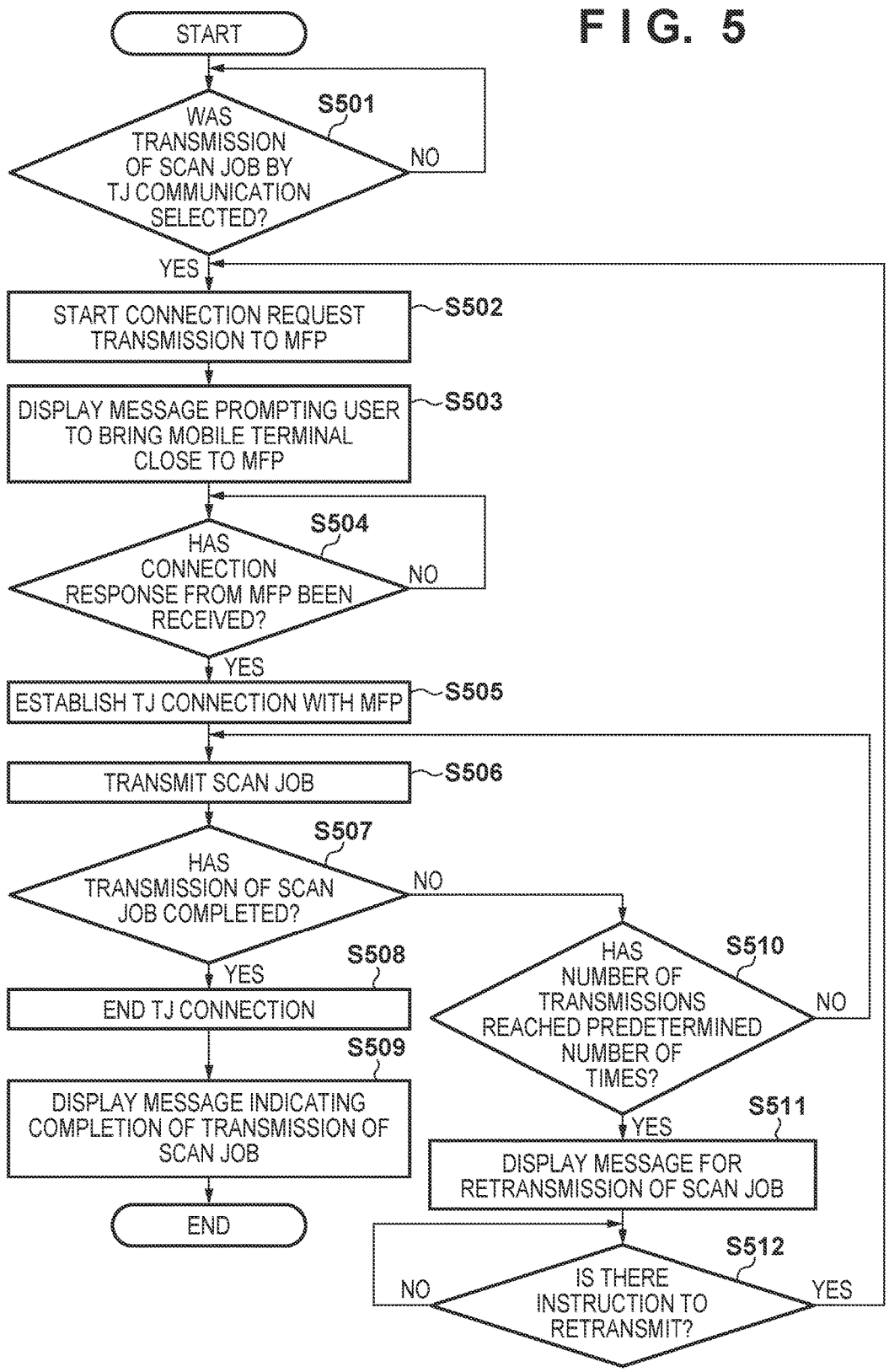
FIG. 5 is a flowchart for illustrating a control procedure for the mobile terminal to transmit a scan job.

FIG. 5 is a flowchart for illustrating a control procedure for the mobile terminal 30 to transmit a scan job to the MFP 20. Processing of each step illustrated in FIG. 5 is realized in the mobile terminal 30 by the CPU 301 reading out a program stored in the ROM 303 or the storage device 304 and executing it.

In step S501, the CPU 301 determines whether or not scan job transmission by TJ communication was selected, and when it determines that it was selected, advances the processing to step S502. Here, when transmission of a scan job by TJ communication is instructed by pressing the transmit button 1101B in the menu screen of FIG. 11A, the CPU 301 determines that transmission of a scan job by TJ communication was selected.

Figure 11C:
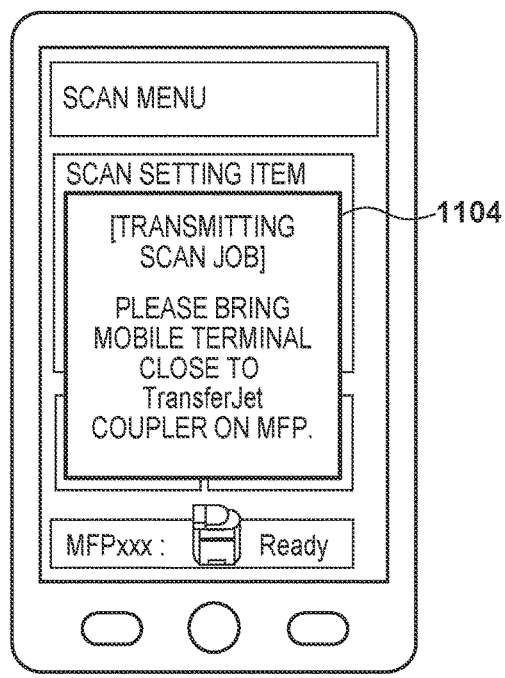

In step S502, the CPU 301 controls the TJ module 402 of the communication apparatus 40 so as to start transmission of a TransferJet connection request. Next, in step S503, the CPU 301 displays on the display unit 307 a message 1104 which is a notification prompting the user to bring the mobile terminal 30 (the communication apparatus 40) close to the MFP 20 as illustrated in FIG. 11C. When the user, after confirming the message 1104 displayed on the display unit 307, moves the mobile terminal 30 (the communication apparatus 40) into the communicable area 10 of the MFP 20, a connection request transmitted from the communication apparatus 40 arrives at and is received by the MFP 20. When the MFP 20 receives the connection request, it transmits a connection response corresponding to the connection request.

In step S504, the CPU 301 determines whether a connection response (from the MFP 20) corresponding to the transmitted connection request was received by the TJ module 402. The CPU 301 repeats the determination of step S504 until the connection response is received, and when the connection response is received, advances the processing to step S505. In step S505, the CPU 301 controls the TJ module 402 so as to establish a TransferJet connection between the mobile terminal 30 and the MFP 20.

Figure 11D:
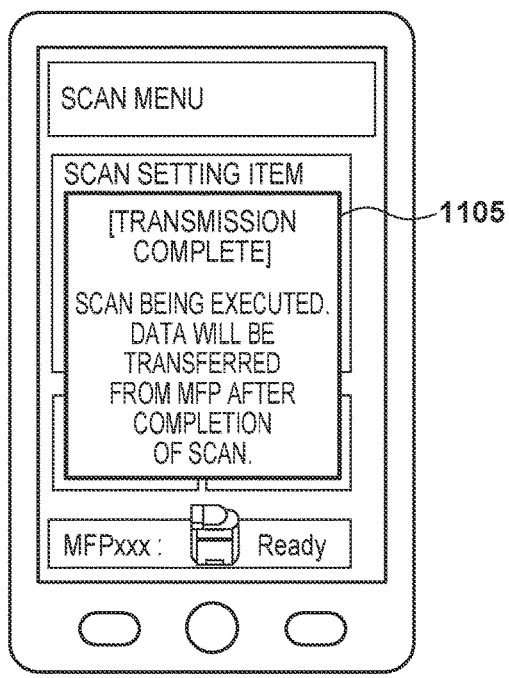

When the TJ connection with the MFP 20 is established, next, in step S506, the CPU 301 controls the TJ module 402 so as to transmit to the MFP 20 the scan job generated as described above. Furthermore, in step S507, the CPU 301 determines whether or not transmission of the scan job to the MFP 20 completed (succeeded). If the transmission completed, the CPU 301 advances the processing to step S508, and ends (disconnects) the TJ connection. After that, in step S509, the CPU 301 displays on the display unit 307 a message 1105 which is a notification indicating that the scan job transmission completed, as illustrated in FIG. 11D, and ends the processing.

A notification that indicates that scan data will be transmitted from the MFP 20 to the mobile terminal 30 after execution of scanning according to the scan job completed is included in the message 1105. By such a notification, it is possible to prompt the user to bring the mobile terminal 30 close to the MFP 20 (cause it to move into the communicable area 10) in order to establish the TJ connection between the MFP 20 and the mobile terminal 30. Note that a notification that prompts the user to bring the mobile terminal 30 close to the MFP 20 after execution of scanning according to the scan job completes may be included in the message 1105.

Meanwhile, if transmission of the scan job has not completed (transmission failed) in step S507, the CPU 301 advances the processing to step S510, and determines whether or not the number of scan job transmissions has reached a predetermined number of times (for example, three times). If the number of transmissions has not reached the predetermined number of times, the CPU 301 returns the processing to step S506, and repeats scan job transmission. Meanwhile, if the number of transmissions has reached the predetermined number of times, the CPU 301 advances the processing to step S511. Note it is possible that the predetermined number of times can be set to be a particular number of times considering user convenience.

Figure 11E:
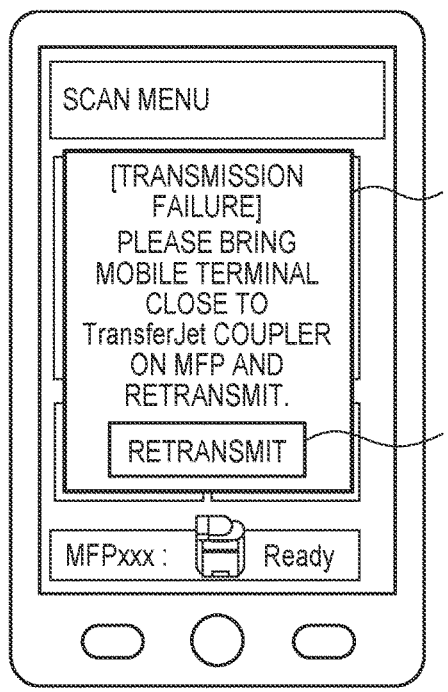

In step S511, the CPU 301, as illustrated in FIG. 11E, displays on the display unit 307 a message 1106 and a retransmit button 1107 which are for scan job retransmission, and advances the processing to step S512. The message 1106 is a notification that indicates that scan job transmission failed, and prompts the user to bring the mobile terminal 30 close to the MFP 20 in order to retransmit the scan job. The retransmit button 1107 is a button for the user to make an instruction to attempt to reestablish a TJ connection by transmission of a TransferJet connection request and retransmit the scan job.

In step S512, the CPU 301 determines whether or not the retransmit button 1107 was pressed. When the CPU 201 determines that the retransmit button 1107 was pressed, it returns the processing to step S502, and re-executes the processing from step S502. By this, the CPU 301 reestablishes the TJ connection with the MFP 20 and retransmits the scan job.

<The MFP 20: Scan Job Reception and Execution>

Figure 6:
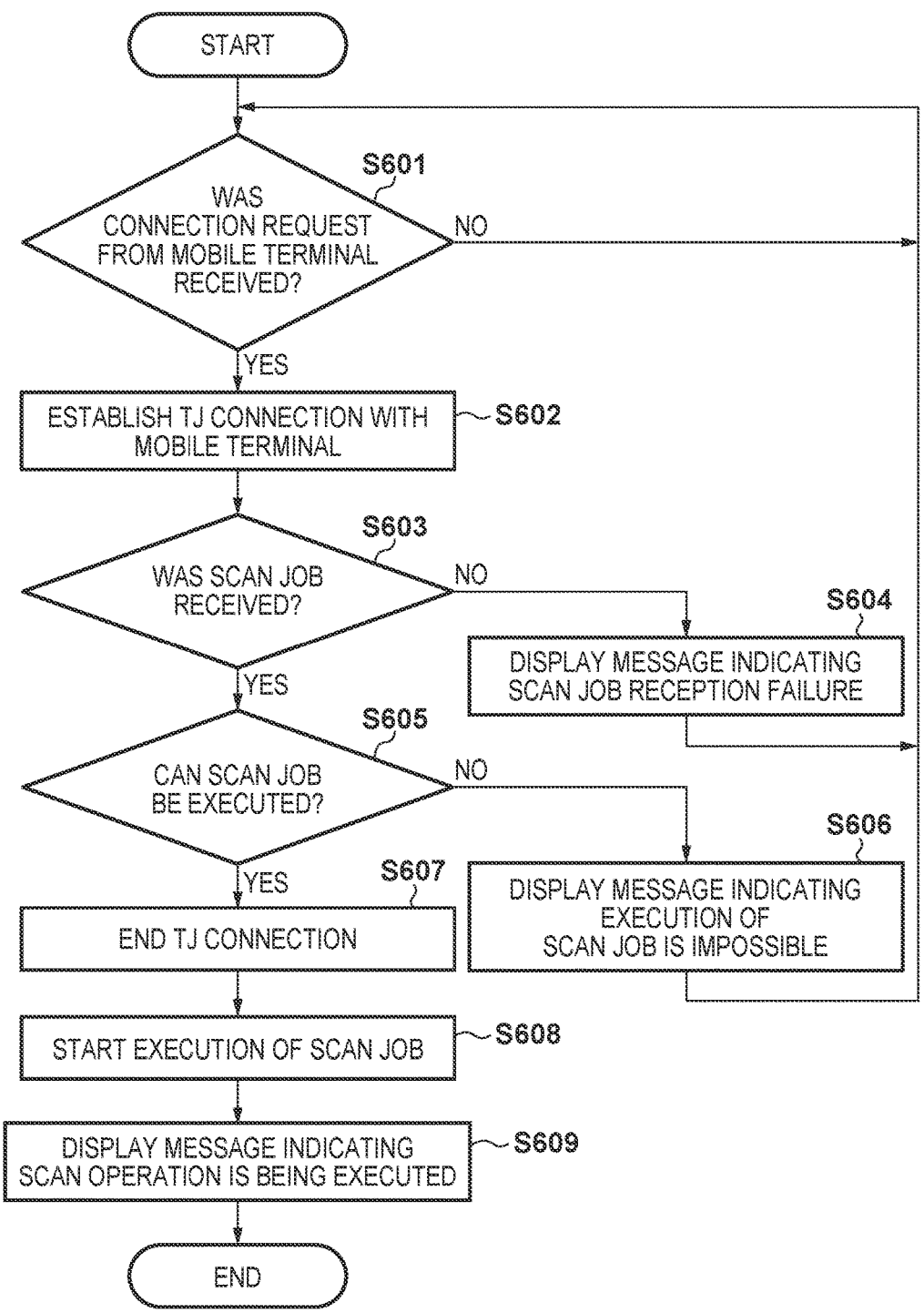
FIG. 6 is a flowchart for illustrating a control procedure for the MFP to receive a scan job.

FIG. 6 is a flowchart for illustrating a control procedure for the MFP 20 to receive a scan job from the mobile terminal 30. Processing of each step illustrated in FIG. 6 is realized in the MFP 20 by the CPU 201 reading out a program stored in the ROM 203 or the storage device 204 and executing it.

In step S601, the CPU 201 determines whether or not a TransferJet connection request transmitted from the mobile terminal 30 (the communication apparatus 40) was received by the TJ module 224. The CPU 201 repeats the determination of step S601 until a connection request is received, and when the connection request is received, advances the processing to step S602. In step S602, the CPU 201, by using the TJ module 224 to transmit a connection response corresponding to the received connection request, establishes a TJ connection with the mobile terminal 30 for TJ communication, and advances the processing to step S603.

After establishing the TJ connection, a scan job is transmitted from the mobile terminal 30 to the MFP 20 (step S506). In step S603, the CPU 201 determines whether the scan job was received by TJ communication. The CPU 201, in a case where scan job reception failed, advances the processing to step S604, and after displaying on the display unit 207 a message (notification) indicating that scan job reception failed, returns the processing to step S601. Meanwhile, the CPU 201, in the case that scan job reception succeeded, advances the processing from step S603 to step S605.

In step S605, the CPU 201 determines whether or not it is possible to execute the scan job received in step S603 on the MFP 20. The CPU 201, in a case where the scan job cannot be executed, advances the processing to step S606, and after displaying on the display unit 207 a message (notification) indicating that the scan job cannot be executed, returns the processing to step S601. Meanwhile, the CPU 201, in a case that the scan job can be executed, advances the processing from step S605 to step S607.

Figure 10A:
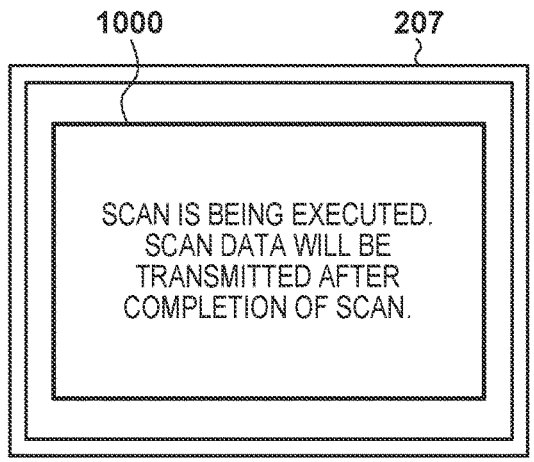
FIG. 10A to FIG. 10D illustrate examples of screens displayed on a display unit of the MFP.

In step S607, the CPU 201 ends (disconnects) the TJ connection. After that, in step S608, the CPU 201 starts execution of the received scan job. That is, the CPU 201, in accordance with the settings of the received scan job, starts execution of a scan operation. While the scan operation is being executed, the CPU 201, in step S609, as illustrated in FIG. 10A, displays to the display unit 207 a message 1000 which is a notification indicating that a scan operation is being executed and that scan data will be transmitted after completion of the scan operation. When the scan operation ends, the CPU 201 ends the processing.

<The MFP 20: Scan Data Transmission>

Figure 7:
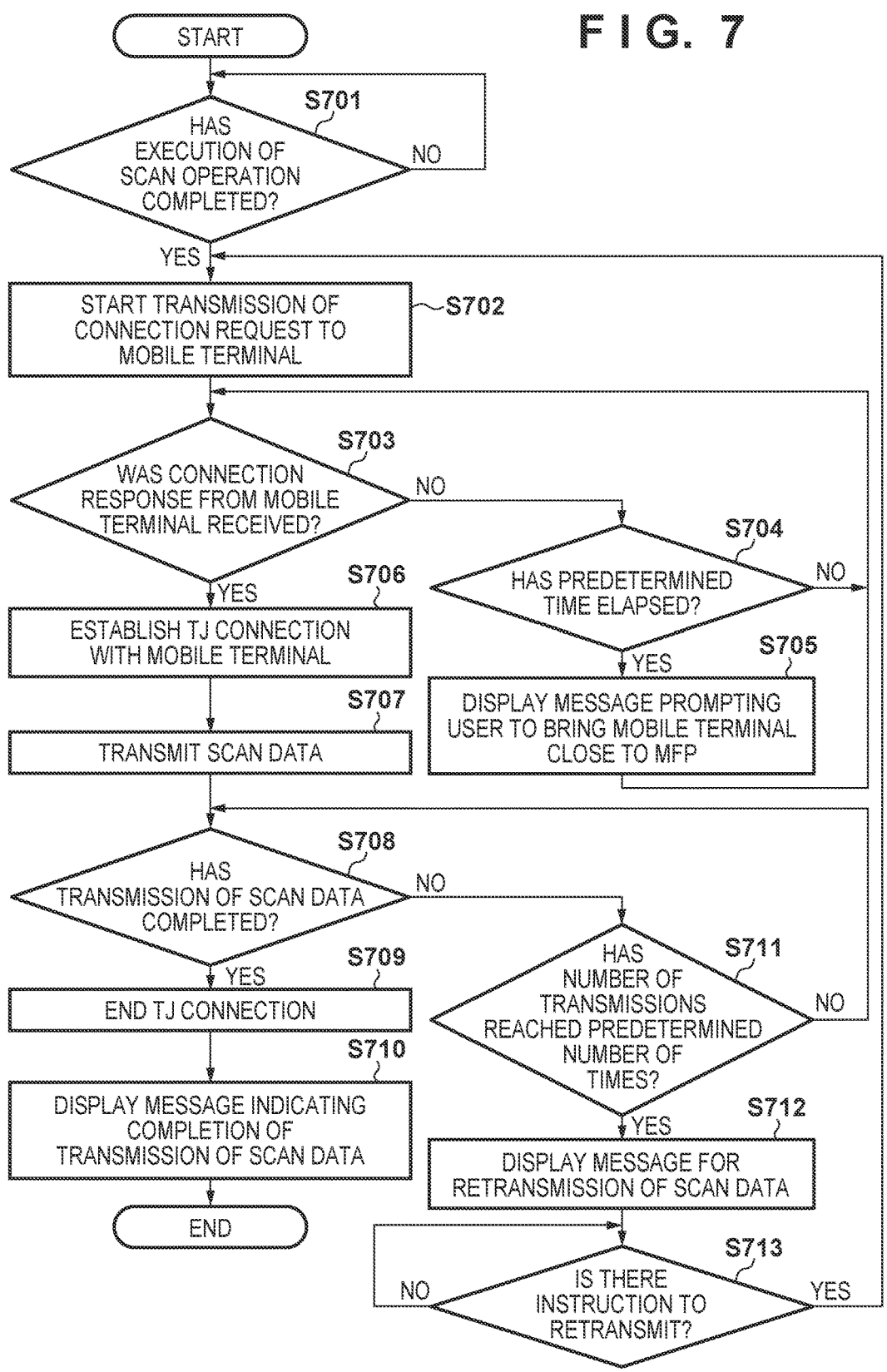
FIG. 7 is a flowchart for illustrating a control procedure for the MFP to transmit scan data.

FIG. 7 is a flowchart for illustrating a control procedure for the MFP 20 to transmit scan data to the mobile terminal 30. Processing of each step illustrated in FIG. 7 is realized in the MFP 20 by the CPU 201 reading out a program stored in the ROM 203 or the storage device 204 and executing it.

In step S701, the CPU 201 determines whether or not execution of the scan job (started in step S608) has completed, and when execution has completed, advances the processing to step S702. In step S702, the CPU 201 controls the TJ module 224 of the MFP 20 so as to start transmission of a TransferJet connection request.

Next, in step S703, the CPU 201 determines whether or not a connection response corresponding to the transmitted connection request was received from the mobile terminal 30 (the communication apparatus 40). The CPU 201, in the case where a connection response was received by the TJ module 224, advances the processing to step S706, and in the case where no connection response was received, advances the processing to step S704. In step S704, the CPU 201 determines whether or not a predetermined time (for example, 100 ms) has elapsed since transmission of the connection request started. The CPU 201, in the case where the predetermined time has not elapsed, returns the processing to step S703, and in the case where the predetermined time has elapsed, advances the processing to step S705. Note that a connection request may be repeatedly transmitted by the TJ module 224 until a connection response is received. Also, it is possible to set the predetermined time to be a particular time considering user convenience.

Here, in the case where the communication apparatus 40 continues to be present within the communicable area 10 after the mobile terminal 30 uses the communication apparatus 40 to transmit the scan job to the MFP 20, the mobile terminal 30 (the communication apparatus 40) can receive a connection request transmitted from the MFP 20. Furthermore, the MFP 20 can receive a connection response transmitted from the mobile terminal 30 (the communication apparatus 40) within the predetermined time. This corresponds to a case in which, during execution of the scan operation by the MFP 20, the user continues to keep the mobile terminal 30 (the communication apparatus 40) within the communicable area 10. In such a case, the CPU 201 advances the processing from step S703 to step S706.

Meanwhile, in the case where the communication apparatus 40 leaves the communicable area 10 after the mobile terminal 30 uses the communication apparatus 40 to transmit the scan job to the MFP 20, a situation may arise in which the MFP 20 cannot receive a connection response within the predetermined time. For example, in the case where the mobile terminal 30 (the communication apparatus 40) could not receive a connection request transmitted from the MFP 20 within the predetermined time, the connection response is not transmitted from the mobile terminal 30, and so the MFP 20 cannot receive a connection response. This corresponds to a case in which during execution of the scan operation by the MFP 20, the user moves the mobile terminal 30 (the communication apparatus 40) outside of the communicable area 10. In such a case, the CPU 201 advances the processing from step S704 to step S705.

Figure 10B:
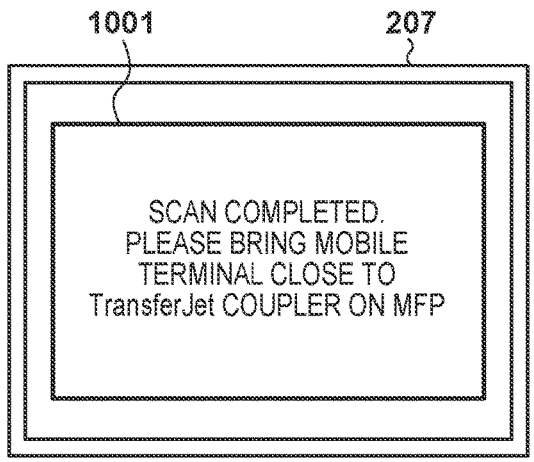

Next, in step S705, the CPU 201 displays on the display unit 207 a message 1001 which is a notification prompting the user to bring the mobile terminal 30 (the communication apparatus 40) close to the MFP 20 as illustrated in FIG. 10B, and returns the processing to step S703. In this way, the MFP 20 prompts the user to bring the mobile terminal 30 (the communication apparatus 40) close to the MFP 20 if the connection response is not received by the time the predetermined time elapses from when the connection request transmission is started.

When the user, after confirming the message 1001 displayed on the display unit 207, moves the mobile terminal 30 (the communication apparatus 40) into the communicable area 10 of the MFP 20, a connection request transmitted from the MFP 20 arrives at and is received by the communication apparatus 40. Furthermore, the mobile terminal 30 uses the communication apparatus 40 to transmit a connection response corresponding to the received connection request. When the connection response is received by the TJ module 224, the CPU 201 advances the processing from step S703 to step S706.

Figure 10C:
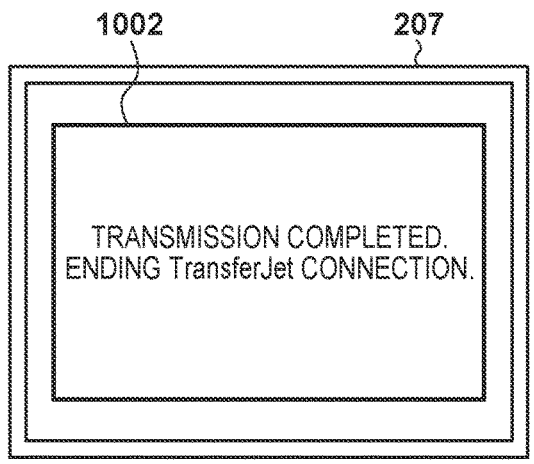

In step S706, the CPU 201 controls the TJ module 224 to establish a TJ connection between the MFP 20 and the mobile terminal 30 (the communication apparatus 40). When the TJ connection with the mobile terminal 30 is established, next, in step S707, the CPU 201 controls the TJ module 224 so as to transmit to the mobile terminal 30 the scan data. Furthermore, in step S708, the CPU 201 determines whether or not transmission of the scan data to the mobile terminal 30 completed (succeeded). If the transmission completed, the CPU 201 advances the processing to step S709, and ends (disconnects) the TJ connection. After that, in step S710, the CPU 201 displays on the display unit 207 a message 1002 which is a notification indicating that the scan data transmission completed, as illustrated in FIG. 10C, and ends processing.

Meanwhile, if transmission of the scan data has not completed (transmission failed) in step S708, the CPU 201 advances the processing to step S711, and determines whether or not the number of scan data transmissions has reached a predetermined number of times (for example, three times). If the number of transmissions has not reached the predetermined number of times, the CPU 201 returns the processing to step S707, and repeats scan data transmission. Meanwhile, if the number of transmissions has reached the predetermined number of times, the CPU 201 advances the processing to step S712. Note it is possible that the predetermined number of times can be set to be a particular number of times considering user convenience. For example, when the mobile terminal 30 (the communication apparatus 40) leaves the communicable area 10 during transmission of scan data, transmission does not complete even after repeating execution of the scan data transmission the predetermined number of times. In such a case, the CPU 201 advances the processing from step S711 to step S712.

Figure 10D:
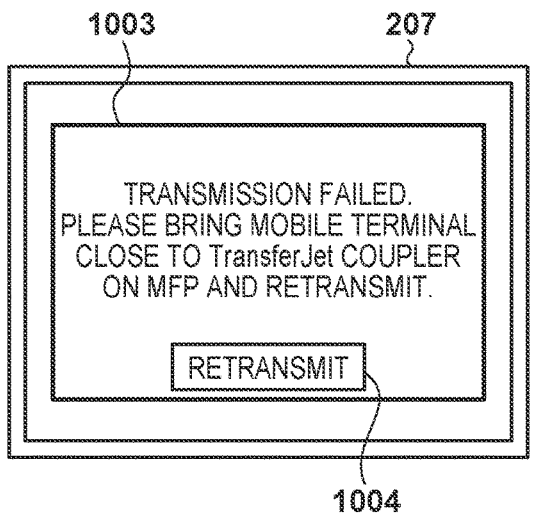

In step S712, the CPU 201, as illustrated in FIG. 10D, displays on the display unit 207 a message 1003 and a retransmit button 1004 which are for scan data retransmission, and advances the processing to step S713. The message 1003 is a notification that indicates that scan data transmission failed, and prompts the user to bring the mobile terminal 30 close to the MFP 20 in order to retransmit the scan data. The retransmit button 1004 is a button for the user to make an instruction to attempt to reestablish a TJ connection by transmission of a TransferJet connection request and retransmit the scan data.

In step S713, the CPU 201 determines whether the retransmit button 1004 was pressed. When the CPU 201 determines that the retransmit button 1004 was pressed, it returns the processing to step S702, and re-executes the processing from step S702.

<The Mobile Terminal 30: Scan Data Reception>

Figure 8:
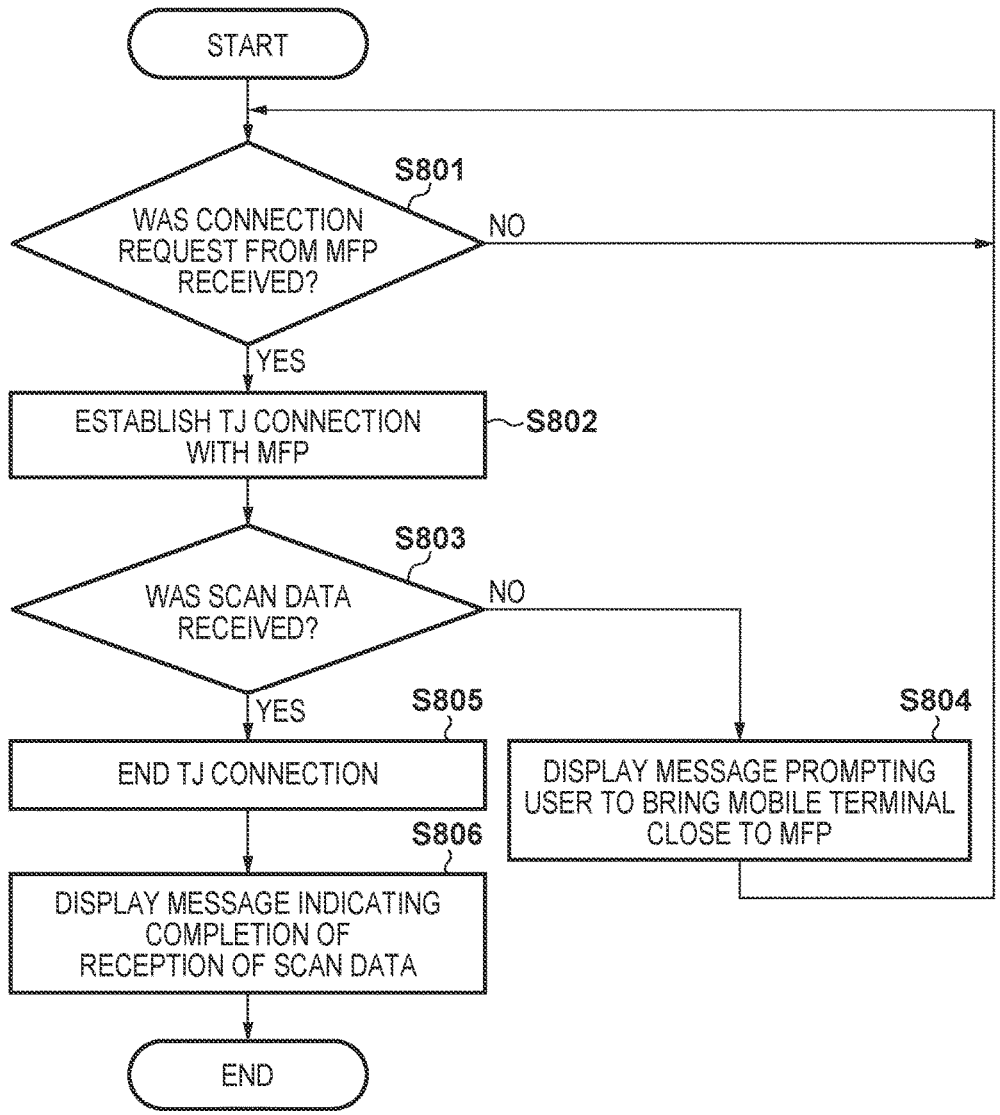
FIG. 8 is a flowchart for illustrating a control procedure for the mobile terminal to receive scan data.

FIG. 8 is a flowchart for illustrating a control procedure for the mobile terminal 30 to receive scan data from the MFP 20. Processing of each step illustrated in FIG. 8 is realized in the mobile terminal 30 by the CPU 301 reading out a program stored in the ROM 303 or the storage device 304 and executing it.

In step S801, the CPU 301 determines whether or not a TransferJet connection request is received by the TJ module 402 that was transmitted from the MFP 20. The CPU 301 repeats the determination of step S801 until the connection request is received, and when the connection request is received, advances the processing to step S802. In step S802, the CPU 301, by using the TJ module 402 to transmit a connection response corresponding to the received connection request, establishes a TJ connection with the MFP 20 for TJ communication, and advances the processing to step S803.

Figure 11F:
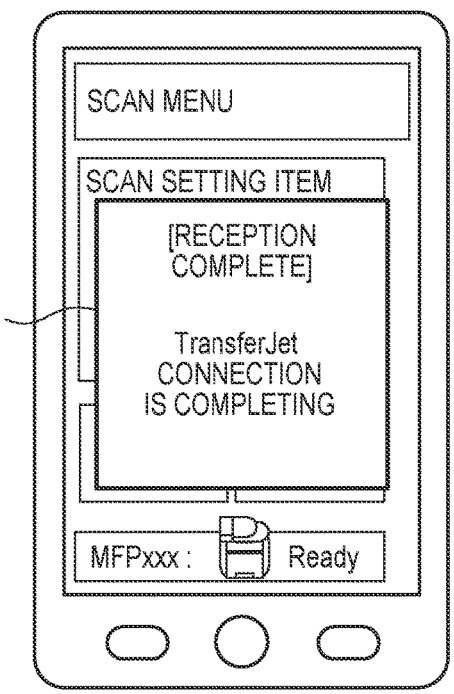

After establishing the TJ connection, scan data is transmitted from the MFP 20 to the mobile terminal 30 (step S707). In step S803, the CPU 301 determines whether the scan data was received by TJ communication. The CPU 301, in the case that scan data reception succeeded, advances the processing to step S805. In step S805, the CPU 301 ends (disconnects) the TJ connection. Furthermore, in step S806, a message 1108 indicating that scan data reception completed is displayed on the display unit 307, as illustrated in FIG. 11F, and processing is ended.

Figure 11G:
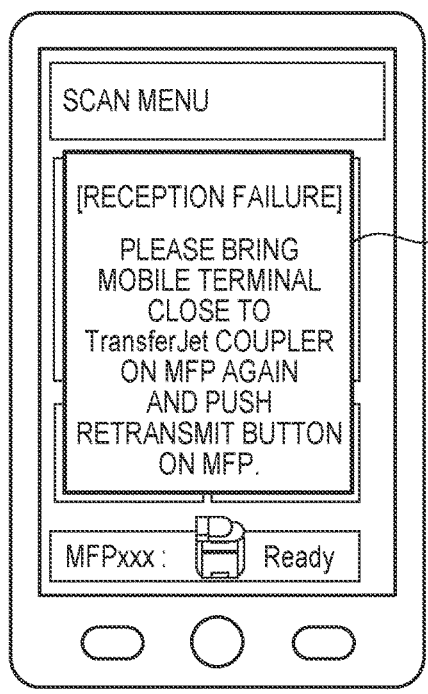

Meanwhile, the CPU 301, in the case that scan data reception failed, advances the processing to step S804. In step S804, the CPU 301, as illustrated in FIG. 11G, returns the processing to step S801 after displaying a message 1109 on the display unit 307. The message 1109 is a notification that indicates that scan data reception failed, and prompts the user to bring the mobile terminal 30 (the communication apparatus 40) close to the MFP 20 once again.

<The Mobile Terminal 30: Select the MFP to Use>

Figure 9:
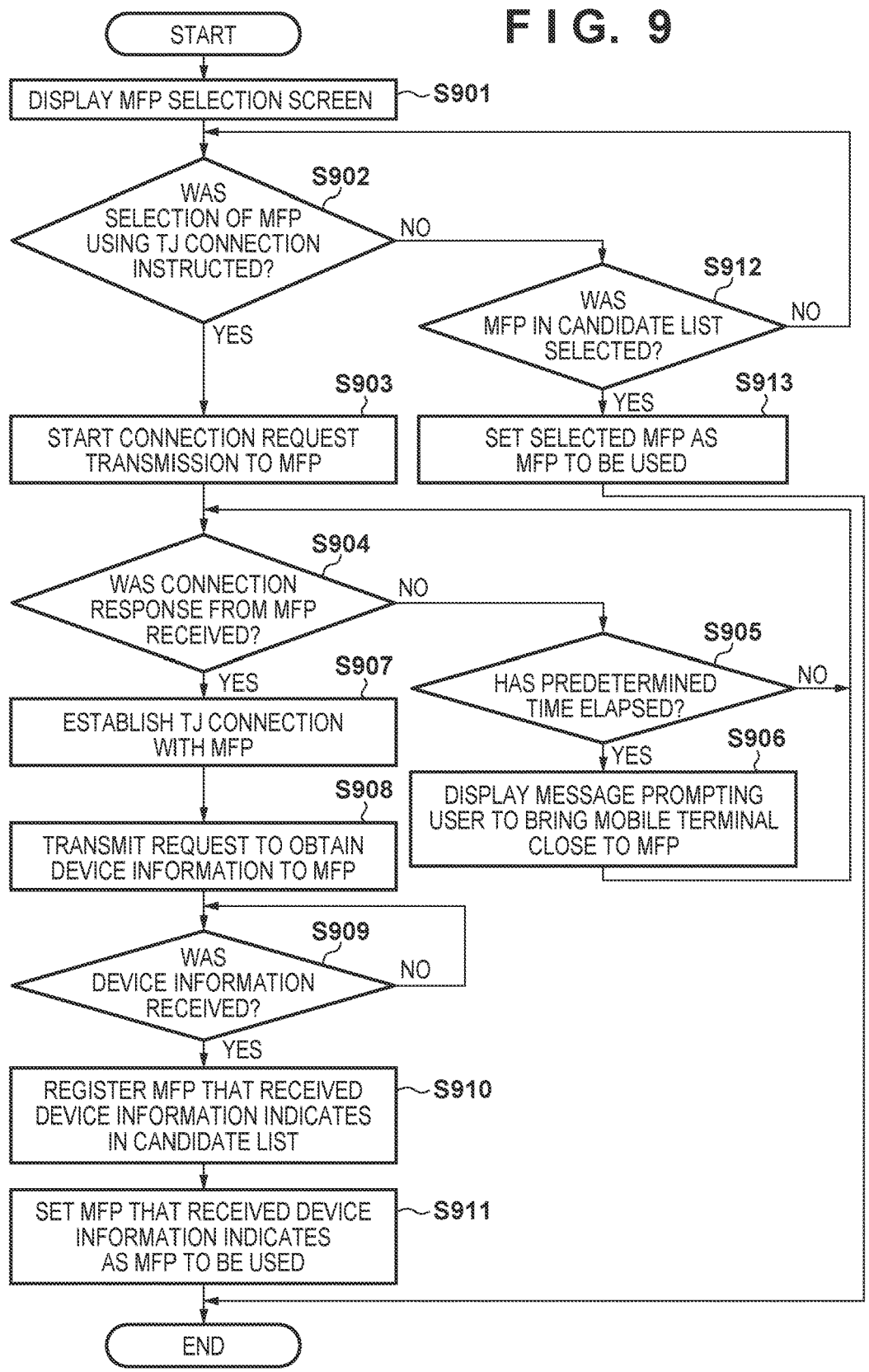
FIG. 9 is a flowchart for illustrating a control procedure for the mobile terminal to select an MFP to use.

FIG. 9 is a flowchart for illustrating a control procedure for the mobile terminal 30 to select the MFP to use (to connect to). Processing of each step illustrated in FIG. 9 is realized in the mobile terminal 30 by the CPU 301 reading out a program stored in the ROM 303 or the storage device 304 and executing it. The control procedure illustrated in FIG. 9 is executed when the region 1102 in the menu screen of FIG. 11A is pressed.

In the present embodiment, the CPU 301 transmits a TransferJet connection request, and obtains apparatus information by TJ communication from the MFP with which a TJ connection is established by reception of a connection response corresponding to the connection request. Furthermore, the CPU 301, based on the obtained apparatus information, sets the MFP to be used (to which to transmit a scan job). Note that below is an example of a case in which the MFP 20 is newly set (selected) as the MFP to be used.

In step S901, the CPU 301 prompts the user to select the MFP by displaying on the display unit 307 a selection screen for selecting the MFP to be used. This selection screen includes a candidate list in which MFPs that were used in the past are listed as selection candidates, and a button for a user to instruct to newly select an MFP using a TJ connection. After displaying the selection screen, the CPU 301, in step S902, determines whether or not there was an instruction to select an MFP using a TJ connection. The CPU 301 advances the processing to step S903 if there was an instruction to select an MFP using a TJ connection, and advances the processing to step S912 if there was no such instruction.

In step S912, the CPU 301 determines whether or not an MFP included in the candidate list displayed on the display unit 307 was selected by the user, and if no MFP was selected, returns the processing to step S902, and if one was selected, advances the processing to step S913. In step S913, the CPU 301 sets the MFP selected from the candidate list as the MFP to be used, and ends the processing. Note that the CPU 301 returns the display screen of the display unit 307 to the menu screen of FIG. 11A from the above-described selection screen. At that time, the MFP set in step S913 is displayed on the region 1102 of the menu screen.

Meanwhile, in step S903, similarly to in step S502, the CPU 301 controls the TJ module 402 of the communication apparatus 40 so as to start transmission of a TransferJet connection request. Note that at that time, the user of the mobile terminal 30 needs to bring the mobile terminal 30 (the communication apparatus 40) within the communicable area 10 of the MFP 20 newly selected to be used. Next, in step S904, similarly to in step S504, it is determined whether or not a connection response (from the MFP 20) corresponding to the transmitted connection request was received by the TJ module 402. The CPU 301, in the case where the connection response was received by the TJ module 402, advances the processing to step S907, and in the case where the connection response was not received, advances the processing to step S905.

In step S905, the CPU 301 determines whether or not a predetermined time (for example, 100 ms) has elapsed since the time the transmission of the connection request was started. The CPU 301, in the case where the predetermined time has not elapsed, returns the processing to step S904, and in the case where the predetermined time has elapsed, advances the processing to step S906. In step S906, the CPU 301 displays on the display unit 307 a message which is a notification prompting the user to bring the mobile terminal 30 (the communication apparatus 40) close to the MFP 20, and returns the processing to step S904. In this way, the MFP 20 prompts the user to bring the mobile terminal 30 (the communication apparatus 40) close to the MFP 20 if the connection response is not received by the time the predetermined time elapses from when the connection request transmission is started. Note that a connection request may be repeatedly transmitted by the TJ module 402 until a connection response is received. Also, it is possible to set the predetermined time to be a particular time considering user convenience.

In the case of advancing the processing from step S904 to step S907, the CPU 301, in step S907, controls the TJ module 402 to establish a TJ connection between the mobile terminal 30 and the MFP 20 similarly to in step S505. When the TJ connection with the MFP 20 is established, next, in step S908, the CPU 301 controls the TJ module 402 so as to transmit, by TJ communication, to the MFP 20 a request to obtain device information (apparatus information). Furthermore, in step S909, the CPU 301 determines whether or not device information transmitted from the MFP 20 in accordance with the transmitted the obtainment request was received by the TJ module 402. When device information was received, the CPU 301 advances the processing to step S910, and adds the MFP (the MFP 20) that the received device information indicates to the above-described candidate list for MFP selection. Furthermore, in step S911, the CPU 301 sets the MFP that the received device information indicates (the MFP 20) as the MFP to be used, and ends the processing. Note that the CPU 301 returns the display screen of the display unit 307 to the menu screen of FIG. 11A from the above-described selection screen. At that time, the MFP set in step S911 is displayed on the region 1102 of the menu screen.

As described above, by virtue of the present embodiment, it is possible to realize scan processing in which TransferJet is used to cause the MFP 20 to execute a scan job from the mobile terminal 30, and to cause scan data to be transferred from the MFP 20 to the mobile terminal 30. Also, it becomes possible for the user to easily understand work that needs to be done in order to realize the scan processing by displaying a notification prompting the user to bring the mobile terminal 30 close to the MFP 20 after execution of the scan completes by the MFP 20.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-236243, filed Dec. 5, 2016, which is hereby incorporated by reference herein in its entirety.

What is claimed is:

1. An image processing apparatus comprising:
    a scanner that scans a document to generate image data based on an image of the document;
    a controller that notifies a user to bring a mobile terminal close to a communicable area with the image processing apparatus; and
    a transmitter that transmits the generated image data to the mobile terminal by short range radio communication,
    wherein the controller determines whether the image processing apparatus cannot communicate with the mobile terminal by the short range radio communication,
    wherein the controller notifies the user to bring the mobile terminal close to the communicable area with the image processing apparatus in a case where the controller determines that the image processing apparatus cannot communicate with the mobile terminal by the short range radio communication, and the transmitter transmits the generated image data to the mobile terminal by the short range radio communication after the image processing apparatus becomes able to communicate with the mobile terminal by the short range radio communication, and
    wherein the controller does not notify the user to bring the mobile terminal close to the communicable area with the image processing apparatus in a case where the controller determines that the image processing apparatus can communicate with the mobile terminal by the short range radio communication, and the transmitter transmits the generated image data to the mobile terminal by the short range radio communication.

2. The image processing apparatus according to claim 1, further comprising:
    a receiver that receives a request for establishing the short range radio communication from the mobile terminal via the short range radio communication;
    the controller establishes the short range radio communication with the mobile terminal based on the request being received by the receiver,
    wherein upon the short range radio communication with the mobile terminal being established by the controller, the receiver receives from the mobile terminal an instruction that causes the scanner to scan the document, and
    upon reception of the instruction, the controller disconnects the short range radio communication with the mobile terminal and the scanner starts scanning in accordance with the instruction.

3. The image processing apparatus according to claim 1, wherein the controller includes a display that displays information for notifying a user to bring the mobile terminal close to the communicable area.

4. The image processing apparatus according to claim 1, wherein the short range radio communication is communication using TransferJet.

5. The image processing apparatus according to claim 1, further comprising a printer that prints an image on a sheet based on the generated image data.

6. The image processing apparatus according to claim 1, wherein the communicable area is an area where the transmitter can transmit data to the mobile terminal by a communication using TransferJet.

7. The image processing apparatus according to claim 1, wherein the controller determines whether the image processing apparatus cannot communicate with the mobile terminal by the short range radio communication after scanning of the document by the scanner.

8. A method of controlling an image processing apparatus, the method comprising:
   scanning a document to generate image data based on an image of the document;
   determining whether the image processing apparatus cannot communicate with the mobile terminal by short range radio communication;
   notifying a user to bring a mobile terminal close to a communicable area with the image processing apparatus; and
   transmitting the generated image data to the mobile terminal by the short range radio communication,
   wherein notification is performed in a case where it is determined that the image processing apparatus cannot communicate with the mobile terminal by the short range radio communication, and the generated image data is transmitted to the mobile terminal by the short range radio communication after the image processing apparatus becomes able to communicate with the mobile terminal by the short range radio communication, and
   wherein notification is not performed in a case where the controller determines that the image processing apparatus can communicate with the mobile terminal by the short range radio communication, and the generated image data is transmitted to the mobile terminal by the short range radio communication.

9. A non-transitory computer-readable storage medium storing a computer program for causing a computer to execute a method of controlling an image processing apparatus, the method comprising:
   scanning a document to generate image data based on an image of the document;
   determining whether the image processing apparatus cannot communicate with the mobile terminal by short range radio communication;
   notifying a user to bring a mobile terminal close to a communicable area with the image processing apparatus; and
   transmitting the generated image data to the mobile terminal by the short range radio communication,
   wherein notification is performed in a case where it is determined that the image processing apparatus cannot communicate with the mobile terminal by the short range radio communication, and the generated image data is transmitted to the mobile terminal by the short range radio communication after the image processing apparatus becomes able to communicate with the mobile terminal by the short range radio communication, and
   wherein notification is not performed in a case where the controller determines that the image processing apparatus can communicate with the mobile terminal by the short range radio communication, and the generated image data is transmitted to the mobile terminal by the short range radio communication.

* * * * *